United States Patent
Ojard

(10) Patent No.: US 7,317,735 B1
(45) Date of Patent: Jan. 8, 2008

(54) SCRAMBLER INITIALIZATION IN A WIRELESS LOCAL AREA NETWORK

(75) Inventor: Eric J. Ojard, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 1021 days.

(21) Appl. No.: 10/447,626

(22) Filed: May 29, 2003

Related U.S. Application Data

(60) Provisional application No. 60/392,573, filed on Jun. 27, 2002.

(51) Int. Cl.
- *H04J 3/16* (2006.01)
- *H04J 3/24* (2006.01)
- *H04J 3/00* (2006.01)

(52) U.S. Cl. ............ 370/470; 370/471; 370/473; 370/476

(58) Field of Classification Search ............ 370/470, 370/471, 473, 476
See application file for complete search history.

(56) References Cited

U.S. PATENT DOCUMENTS

| | | | | |
|---|---|---|---|---|
| 5,621,799 A | * | 4/1997 | Katta et al. ............ | 380/217 |
| 6,349,138 B1 | * | 2/2002 | Doshi et al. ............ | 380/200 |
| 2002/0138721 A1 | * | 9/2002 | Kwon et al. ............ | 713/151 |
| 2003/0023915 A1 | * | 1/2003 | Choi ............ | 714/748 |
| 2003/0145196 A1 | * | 7/2003 | Heegard et al. ............ | 713/150 |
| 2003/0231658 A1 | * | 12/2003 | Liang et al. ............ | 370/469 |

* cited by examiner

*Primary Examiner*—Kwang Bin Yao
*Assistant Examiner*—Warner Wong
(74) *Attorney, Agent, or Firm*—Garlick Harrison & Markison; James A. Harrison

(57) ABSTRACT

A method and system of the present invention includes the creation and transmission of a MAC header that includes a first MAC header portion and at least two scrambler recovery fields arranged on the two sides (before and after) of a header FEC portion. The invention includes determining whether a scrambler initialization field received at the physical layer was received in error, and if so, evaluating either one of the de-scrambled values of the two scrambler recovery fields in relation to a table to determine a pseudorandom sequence initialization value that corresponds to a given de-scrambled scrambler recovery field value. Once the corresponding pseudorandom sequence initialization value is determined, that value may be used to further de-scramble the data in the data frame to produce a correctly de-scrambled data frame.

15 Claims, 6 Drawing Sheets

SCRAMBLER INITIALIZATION IN A WIRELESS LOCAL AREA NETWORK

CROSS-REFERENCE TO RELATED APPLICATION(S)

This application claims priority to and incorporates by reference U.S. Provisional Application entitled, "Scrambler Initialization in a Wireless Local Area Network", having a Ser. No. 60/392,573 and a filing date of Jun. 27, 2002.

TECHNICAL FIELD OF THE INVENTION

This invention relates generally to wireless communication systems and more particularly to premises based wireless communication systems.

BACKGROUND OF THE INVENTION

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated wireless access point (e.g., for an in-home or in-building wireless network) via an assigned channel. To complete a communication connection between the wireless communication devices, the associated base stations and/or associated wireless access points communicate with each other directly, via a system controller, via the public switched telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency (IF) stages, and a power amplifier. The data modulation stage, also referred to herein as a baseband processor, converts raw data into baseband signals in accordance with the particular wireless communication standard. The one or more IF stages mix the baseband signals with one or more local oscillations to produce RF signals. The power amplifier amplifies the RF signals prior to transmission via an antenna. A receiver of the radio transceiver performs the inverse of these operations to produce raw data.

Wireless Local Area Networks (WLANs) operate according to various operating standards, e.g., IEEE 802.11(a), IEEE 802.11(b), etc. Other standards are under development and/or are expected to be developed as communication systems evolve. Operations compliant with one of these operating standards ensure interoperability with equipment of other vendors that is also compliant with the operating standard. One aspect of many data communication standards relate to protecting data or facilitating the detection of data with error to trigger a specified corrective action. For example, forward error correction (FEC) is a technique used by a receiver or a receiver portion of a radio transceiver for correcting errors introduced into a signal while being transmitted over a communication channel without requiring retransmission of any information by the transmitter. In some protection schemes, forward error correction is used to protect the data within a portion of a frame, but is not used to protect all transmitted information. For example, in one system, FEC is used at the medium access control (MAC) layer to protect MAC layer signals. In this scheme, physical layer data, which includes important information required to process the data frame, is transmitted in a header without protection. Accordingly, if an error is introduced in physical layer, forward error correction may not be used to correct the physical layer information or data and may result in loss of the entire frame.

One particular limitation relating to forward error correction is known as scrambler error propagation. Typically, physical layer modulation schemes include the use of a pseudorandom sequence that is logically applied to a received bit stream of a data frame to achieve certain desired effects, including the avoidance of the generation of tones in the data resulting from specified data patterns in the transmitted data. For example, the bit stream may be exclusively OR'ed with the pseudorandom sequence. The pseudorandom sequence, however, must be initialized to work properly. Accordingly, either a scrambler initialization value for the pseudorandom sequence or a value that identifies the scrambler initialization value for the pseudorandom sequence is transmitted in a physical layer header and is used to initialize a scrambler to de-scramble a received data frame. In one embodiment, a value that identifies a scrambler initialization value is transmitted in a service field transmitted at the physical layer. For compatibility reasons, forward error correction is added in some networks at other layers above the physical layer. For example, in 802.11 standard based devices, forward error correction is added at the medium access control (MAC) layer rather than the physical layer. Thus, the physical layer header fields and the scrambler initialization field cannot be protected by FEC since they are not part of the MAC layer frame and are received and processed prior to the MAC layer frame. If the scrambler initialization field is received in error, the entire frame is corrupted. Thus, the benefits from utilizing forward error correction are limited only to errors that occur in the frame body and not to errors that occur at the physical layer header.

A need exists, therefore, for a solution to the scrambler error propagation problem and, more specifically, that allows for the proper scrambler recovery even if the transmitted scrambler initialization value is corrupted due to error during transmission.

BRIEF SUMMARY OF THE INVENTION

In order to solve the aforementioned shortcomings of forward error correction, a data frame is formed to have a MAC header that includes a first MAC header portion, and at least two scrambler recovery fields arranged on the two sides (before and after) of a header FEC field for protecting a scrambler initialization field. The scrambler initialization field is formed within a service field at the physical layer and is transmitted prior to the transmission of the MAC header portion. Accordingly, scrambler initialization occurs prior to the transmission of the MAC header containing the at least two scrambler recovery fields. With this and other similar structures in which FEC is not performed at the physical layer but is performed at a higher layer, an error received in the scrambler initialization field would result in a lost frame in the prior art. Here, however, errors in the scrambler initialization field can be corrected at the MAC layer by examination of the at least two scrambler recovery fields to determine a pseudo-random sequence that, when XORed with the received MAC frame, corrects the errors. More generally, and alternatively, this step includes evaluating a de-scrambled value of at least one of the scrambler recovery fields to determine whether it is the same as an expected result.

The invention allows for proper recovery from transmission errors if only one of the at least two scrambler recovery fields and the scrambler initialization field has an error there within. Accordingly, a first de-scrambled recovery field of the at least two scrambler recovery fields is compared to an expected result. If the comparison is favorable, then a radio receiver formed according to the present invention may determine that the frame has been de-scrambled correctly.

If the comparison is not favorable, however, then a second de-scrambled scrambler recovery field is compared to a specified value. If that comparison is favorable, then the radio receiver formed according to the present invention may determine that the frame has been de-scrambled correctly. If, however, the comparison of the second de-scrambled recovery field had an unfavorable result, then it may be determined that the scrambler initialization field itself contained the error. If error is introduced in only one of the scrambler initialization value within the service field or one of the two scrambler recovery fields, the present invention allows for scrambler recovery.

Thus, in this example, if the error was introduced only within the scrambler initialization field, then either one of the scrambler recovery fields may be used to determine a scrambler initialization value that, when used to further de-scrambled the data frame, will result in the data frame having been de-scrambled correctly thereby compensating for error introduced into the scrambler initialization field. Either of the two scrambler recovery fields is then used, in one embodiment of the invention, as an entry point of a look-up table. A corresponding scrambler initialization value in the lookup table could then be used to correctly initialize the scrambler to further de-scramble the data frame to compensate for introduced error.

DETAILED DESCRIPTION

Figure 1:
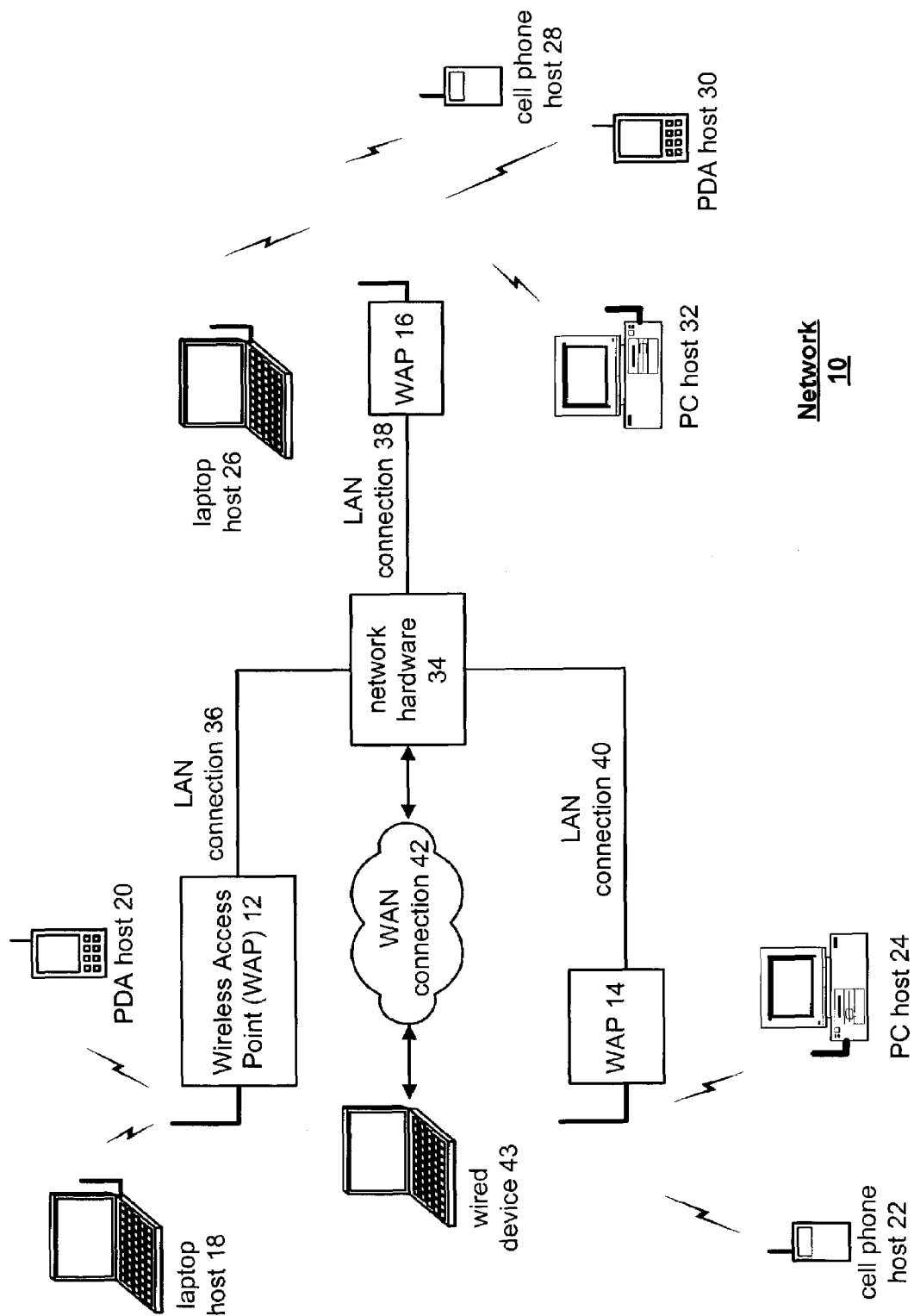
FIG. 1 is a block diagram illustrating a Wireless Local Area Network (WLAN) that operates in accordance with the present invention.

FIG. 1 is a block diagram illustrating a Network 10 that comprises a Wireless Local Area Network (WLAN) as well as a Wide Area Network (WAN) 42 that operate in accordance with the present invention. The Network 10 WLAN includes a plurality of Wireless Access Points (WAPs) 12-16, a plurality of wireless communication devices 18-32 and a network hardware component 34. The wireless communication devices 18-32 may be laptop host computers 18 and 26, Personal Digital Assistant (PDA) hosts 20 and 30, personal computer hosts 24 and 32 and/or cellular telephone hosts 22 and 28. The details of the wireless communication devices will be described in greater detail with reference to FIG. 2. The network 10 WAN includes, for exemplary purposes, only one wired device 43 that represents a great plurality of wired devices that communicate by way of a wired network including digital subscriber lines, telephone networks (through dial-up service), cable and other wired broadband and hi-speed communication networks as well as low speed communication networks. The invention as disclosed herein may be utilized in conjunction with wired communication devices such as wired device 43 or with wireless communication devices such as WAPs 12-16.

The WAPs 12-16 are operably coupled to the network hardware 34 via local area network connections 36, 38 and 40. The network hardware 34, which may be a router, switch, bridge, modem, system controller, etc., provides a wide area network connection 42 for the Network 10. Each of the WAPs 12-16 has an associated antenna or antenna array to communicate with the wireless communication devices in its area. Typically, the wireless communication devices register with a particular WAP 12-16 to receive services from the Network 10. For direct connections (i.e., point-to-point communications), wireless communication devices communicate directly via an allocated channel. Each wireless communication device includes a built-in radio and/or is coupled to a radio transceiver. The radio transceiver includes a highly linear amplifier and/or programmable multi-stage amplifier, as disclosed herein, to enhance performance, reduce costs, reduce size, and/or enhance broadband applications. Each one of the transceivers shown in FIG. 1 may include circuitry that operates according to the present invention and, more specifically, that provides error protection for the scrambler initialization field as described herein.

Each wired device and wireless communication device of network 10 of FIG. 1 may potentially included circuitry that operates according to the present invention. Generally, the present invention provides MAC or higher layer protection of lower level fields. In one specific embodiment of the present invention, a MAC layer scrambler recovery field provides protection for a scrambler initialization value that is transmitted at the physical layer. The inventive concepts described herein, however, may readily be used to protect other heretofore unprotected fields of lower layer transmissions. The invention may be implemented readily in either wired or wireless devices that communicate with other devices.

Figure 2:
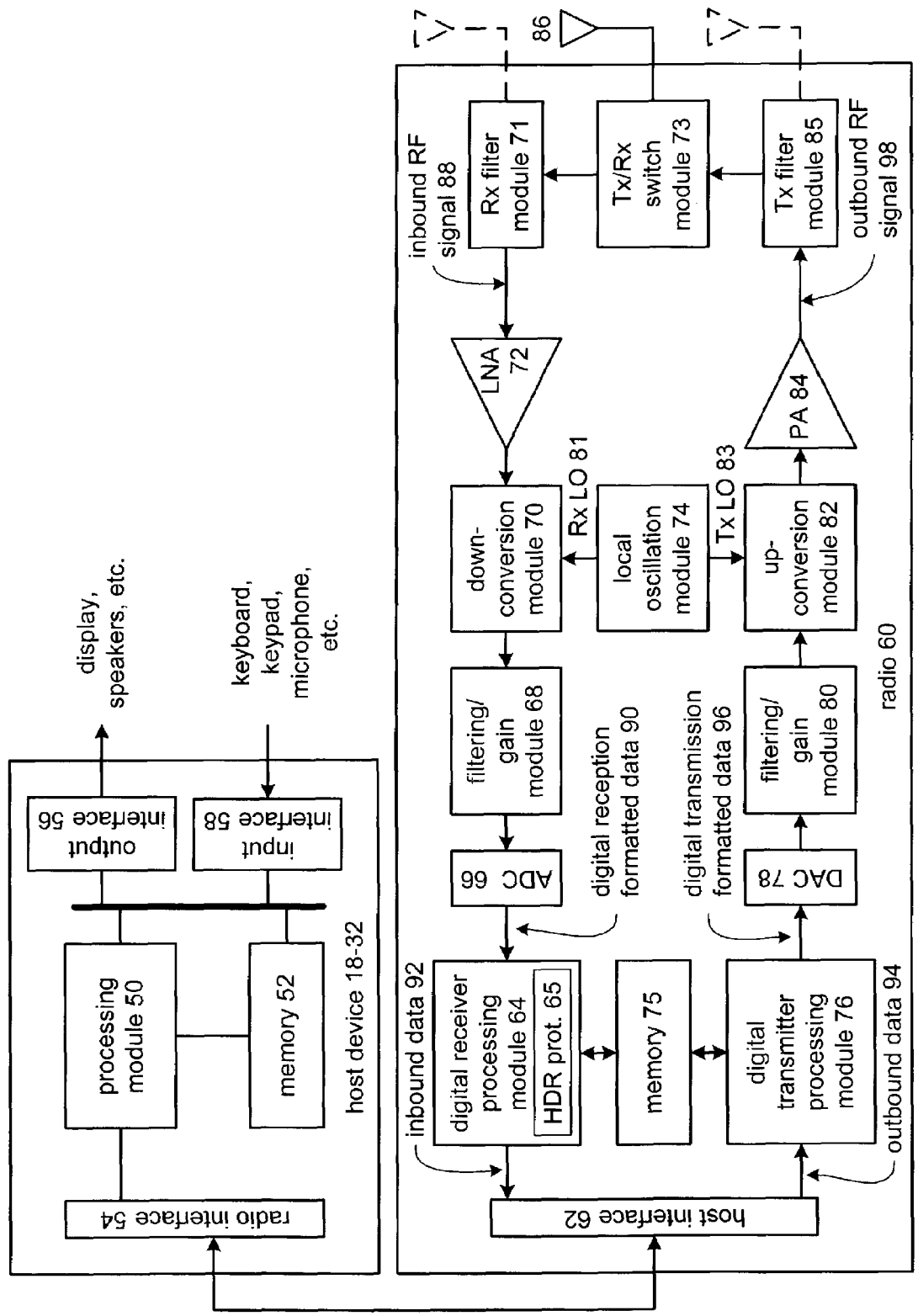
FIG. 2 is a schematic block diagram illustrating a wireless communication device constructed according to the present invention.

FIG. 2 is a schematic block diagram illustrating a wireless communication device that includes the host device 18-32 and an associated radio 60. For personal digital assistants hosts, laptop hosts, and/or personal computer hosts, the radio 60 may be built-in or an externally coupled component. As illustrated, the host device 18-32 includes a processing module 50, memory 52, radio interface 54, input interface 58 and output interface 56. The processing module 50 and memory 52 execute the corresponding instructions that are typically done by the host device. For example, for a laptop computer or PDA host device, the processing module 50 performs the corresponding communication functions to service the processing requirements of the host device.

The radio interface 54 allows data to be received from and sent to the radio 60. The radio 60 operates in accordance with one or more particular WLAN standards, e.g., IEEE 802.11(a), IEEE 802.11(b), etc. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62 and a digital receiver processing module 64, which includes a header protection block 65 that operates as described herein. Header protection block 65 may be formed in hardware or defined by computer instructions executed by a processor of digital receiver processing module 64. Generally, though, header protection block 65 includes scrambler recovery logic for enabling a receiver to initialize a scrambler that would further de-scramble a data frame to yield a properly de-scrambled data frame whenever a data frame has been improperly de-scrambled due to error in a received scrambler initialization value transmitted at an unprotected physical layer.

Radio 60 also includes an analog-to-digital converter 66, a filtering/gain module 68, an IF mixing down-conversion module 70, a receiver filter module 71, a low noise amplifier 72, a transmitter/receiver switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 may be a single antenna that is shared by the transmit and receive paths as regulated by the Tx/Rx switch module 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. In addition to the FEC and scrambler recovery functionality, the digital receiver functions include, but are not limited to, digital intermediate frequency to baseband conversion, demodulation, constellation demapping, decoding, and/or de-scrambling. The digital transmitter functions include, but are not limited to, scrambling, encoding, constellation mapping, modulation, and/or digital baseband to IF conversion. The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the processing module 64 and/or 76 executes, operational instructions corresponding to at least some of the functions illustrated in FIGS. 3-7.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11(a), IEEE 802.11(b), Bluetooth, etc.) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing up-conversion module 82. The IF mixing up-conversion module 82 directly converts the analog base-band or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, a WAP and/or another wireless communication device.

The radio 60 also receives an inbound RF signal 88 via the antenna 86, which was transmitted by a WAP or another wireless communication device. The antenna 86 provides the inbound RF signal 88 to the receiver filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the IF mixing down-conversion module 70, which directly converts the amplified inbound RF signal into an inbound low IF signal or baseband signal based on a receiver local oscillation 81 provided by local oscillation module 74. The IF mixing down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, de-scrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, while the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76, respectively, may be a common processing device implemented on a single integrated circuit. Further, the memory 52 and memory 75 may be implemented on a single integrated circuit and/or on the same integrated circuit as the common processing modules of processing module 50 and the digital receiver processing module 64 and digital transmitter processing module 76.

FIG. 2 illustrates wireless transceiver circuitry that includes circuitry and logic for providing protection of a scrambler initialization value transmitted at the physical layer as described wherein the protection is provided at the MAC layer. It should be understood, however, that the invention expressly is not limited to wireless transceiver devices and may be used in conjunction with any device or circuit that communicates over a wired or wireless connection. Thus, FIGS. 1 and 2 merely illustrate one application of the present invention.

Figure 3:
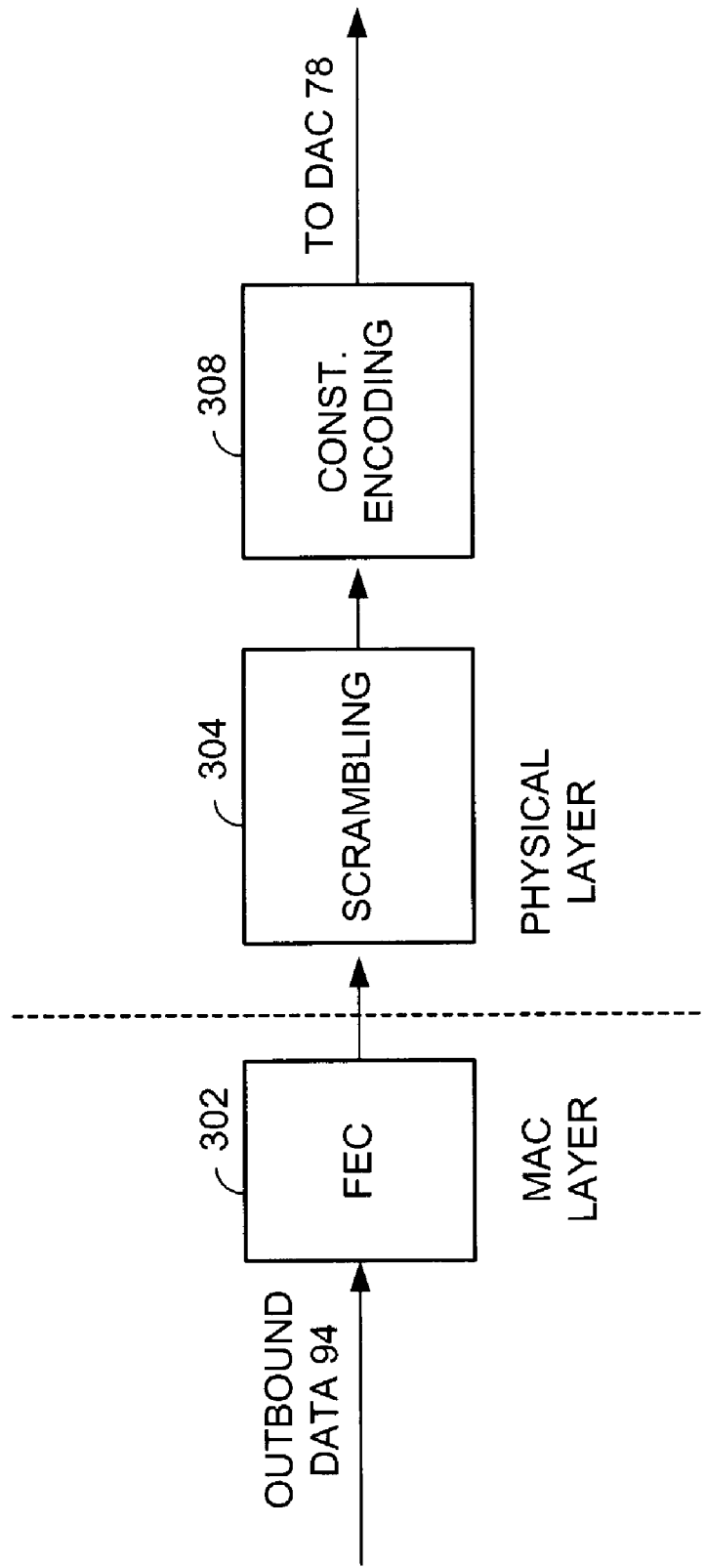
FIG. 3 is a block diagram illustrating the functional blocks of a transmitting WLAN device that forms a physical layer frame according to the present invention.

FIG. 3 is a block diagram illustrating the functional blocks of a transmitting WLAN device that forms a physical layer frame according to the present invention. The operational components of FIG. 3 are the same as those implemented in the digital transmitter processing module 76 of the radio 60 of FIG. 2 or that are appropriately found in wired devices such as wired device 43 of FIG. 1. As a first operation, the outbound data 94 is coded with FEC operations, e.g., Reed-Solomon coding, etc., at FEC block 302. Such encoding is typically performed at the physical layer though, in some systems such as some 802.11 based systems, it is performed at the MAC layer.

The encoded outbound data is then scrambled at the physical layer via scrambling block 304 to, among other reasons, avoid the generation of tones in a receiver due to patterns in the transmitted data. After scrambling is performed, it is constellation encoded at constellation encoding block 308. Supported constellations include Binary Phase Shift Keying (BPSK), Quadrature Phase Shift Keying (QPSK), and differing Quadrature Amplitude Modulation (QAM) constellations, among others. The output of the constellation encoding block 308 is then provided to the DAC 78 of the radio 60 for up-conversion to RF and for transmission.

Figure 4:
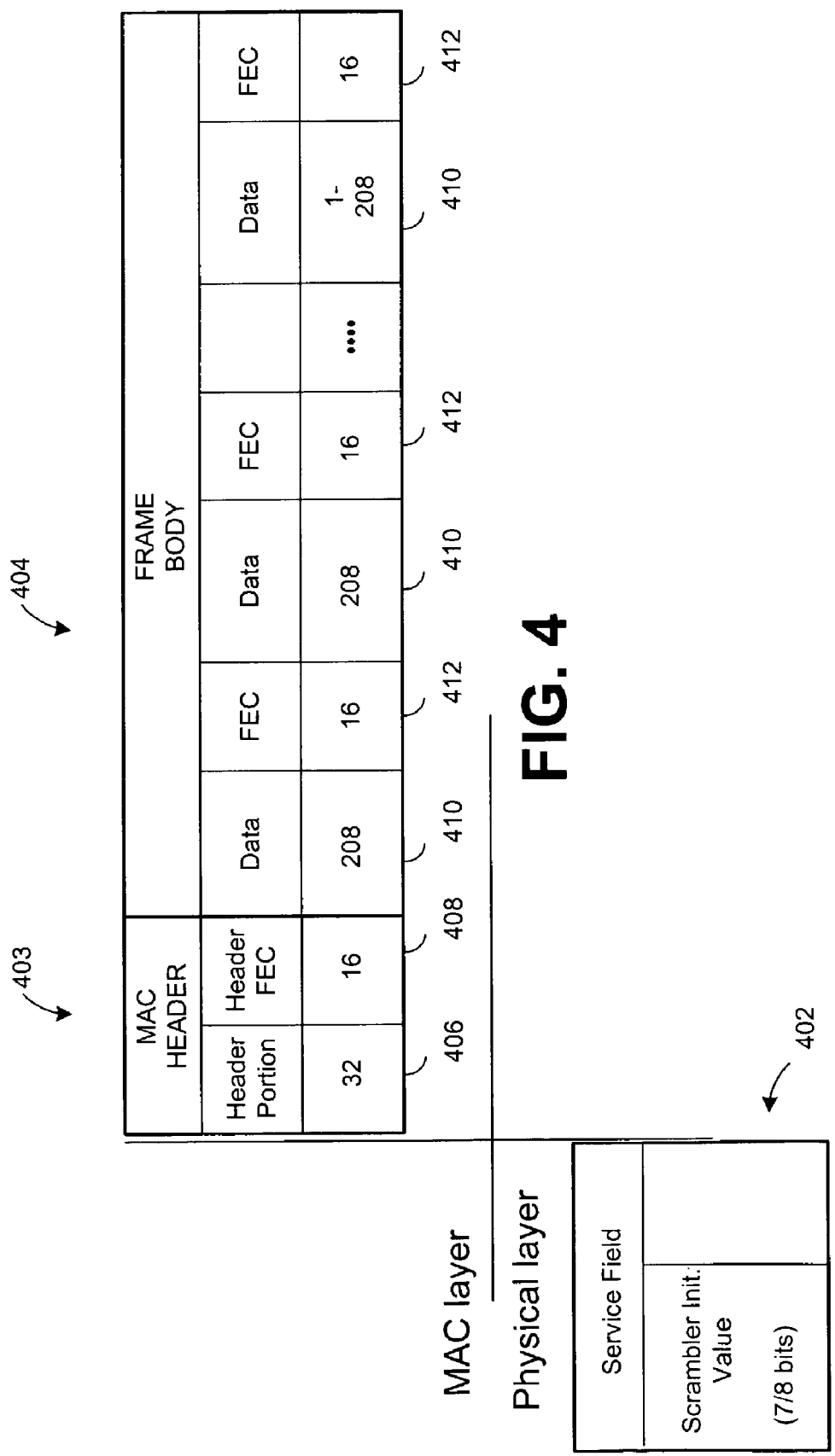
FIG. 4 is a block diagram illustrating the structure of a data frame that may suffer from scrambler error propagation.

FIG. 4 is a block diagram illustrating the structure of a data frame that may suffer from scrambler error propagation. The data frame shown in FIG. 4 includes a physical layer service field 402, a MAC layer header 403 and a frame body 404. The MAC header includes header portion bits 406 and header FEC bits 408. The frame body includes sets of data bits 410 and FEC bits 412.

The MAC header, while providing forward error correction for data 410 within frame body 404, does not include protection for the scrambler initialization value which is transmitted at the physical layer within service field 402. Thus, transient noise and other interference may cause the scrambler initialization value to be received with erroneous values. This limitation is known as scrambler error propagation. Specifically, the initial state of the scrambler (at the receiving side of a data frame) is determined by inspection of the first 7 bits of FEC service field 402. If these bits are received in error, the entire frame is corrupted because a scrambler initialization value was determined incorrectly and the frame is incorrectly de-scrambled. For IEEE 802.11 (a) and IEEE 802.11(g), in which the service field 402 is sent at the same rate as the MAC header 403 and frame body 404, the improvement in frame error rate that forward error correction can provide is limited.

Figure 5:
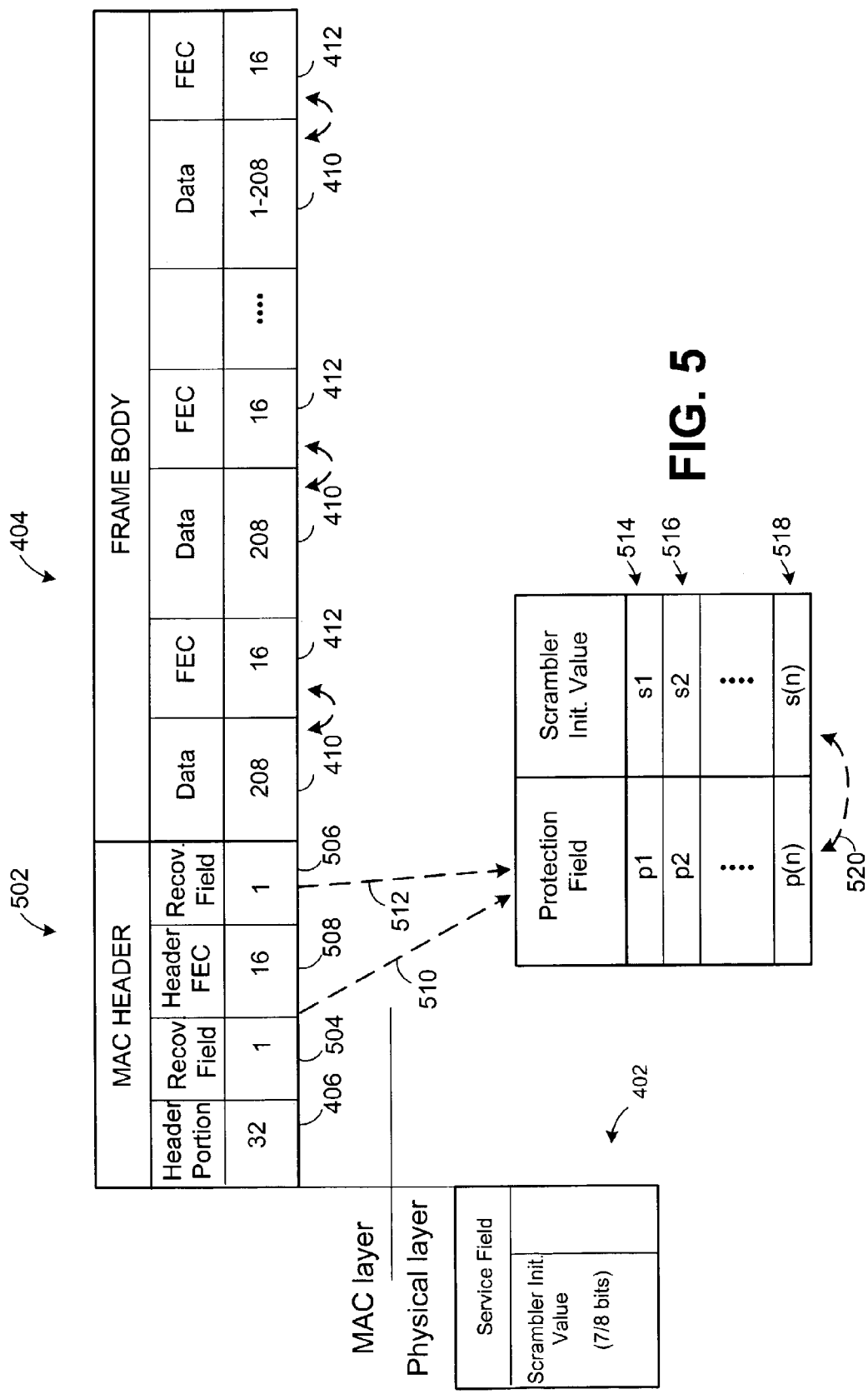
FIG. 5 is a block diagram illustrating the structure of a data frame constructed according to the present invention that overcomes the scrambler error propagation problem and a table that illustrates a method for determining a scrambler initialization value according to one embodiment of the present invention.

FIG. 5 is a block diagram illustrating the structure of a data frame constructed according to the present invention that overcomes the scrambler error propagation problem described before. A data frame 404 formed according to one embodiment of the present invention is illustrated in FIG. 5 wherein the frame body 404 is similar to the frame body 404 as illustrated in FIG. 4. Thus, frame body 404 includes a plurality of data portions 410 that are followed by corresponding FEC portions 412. MAC header 502, in contrast to MAC header 403 of FIG. 4, includes scrambler recovery fields 504 and 506. The recovery fields are used to provide protection for a scrambler initialization field that is transmitted within a service field at the physical layer and are used to identify a scrambler initialization value to further de-scramble a received and incorrectly de-scrambled data frame to yield a correctly de-scrambled data frame. MAC header 502 further includes a header portion 406 that is 32 bytes long. Thereafter, scrambler recovery field 504 is, in the described embodiment, one byte long, as is scrambler recovery field 506. Scrambler recovery fields 504 and 506 are arranged on either side of Header FEC 508.

The operation of scrambler recovery fields 504 and 506 will be explained in greater detail below. Generally, however, scrambler recovery fields 504 and 506 are used to determine whether a value received in the service field 402 was received with or without error and, if with error, to determine a scrambler initialization value that compensates for the received error to further de-scramble the received data to the correct values. Although the exact location of these scrambler recovery fields 504 and 506 within frame body 404 or MAC header 502 is not critical, there are 4 criteria that should be considered:

1) The first 32 bytes of MAC header 502 are used by legacy stations and should not be modified;

2) The scrambler recovery fields are, in the described embodiments, transmitted early in the frame to minimize the latency of the scrambler recovery process;

3) The scrambler recovery fields are, in the described embodiments, separated by several bytes to minimize the error correlation between them; and 4) The scrambler-recovery fields are placed on octet boundaries in the described embodiment because it is more convenient to use 8 bits, although only 7 zero bits are needed for each field.

A receiving wireless device responds to the values in the two extra bytes (scrambler-recovery fields) as follows:

1) If the either or both de-scrambled bit-fields are equal to a specified value (zero in the described embodiment) when de-scrambled using the scrambler initialization value received in the Service Field at the physical layer, then process the frame normally.

2) If both de-scrambled bit-fields are non-zero, then XOR the received and de-scrambled bit-stream with the scrambler sequence that makes the first de-scrambled bit-field equal to the specified value (zero according to the described embodiment). The scrambler initialization for this sequence can be found by a simple table look-up on the first received and de-scrambled scrambler recovery bit-field which yields the expected result.

The invention facilitates scrambler recovery if only one of the three scrambler initialization fields are corrupted. Thus, the inventive method fails when two or more of the three scrambler initialization fields (including the original 7 bits in the service field) are corrupted. Finally, the three fields are separated enough to have uncorrelated error events under Additive White Gaussian Noise (AWGN), so the error probability is given by:

$$P[SI \text{ error}] = \sum_{j=2}^{3} \binom{3}{j} P_{Be}^{j}(1 - P_{Be})^{3-j}$$
$$\cong 3P_{Be}^{2}$$

where $P_{Be}$ is the probability of byte error before FEC.

The location of the two scrambler recovery bit-fields is not critical and may be varied. Moreover, alternate embodiments of the invention include additional scrambler recovery bit-fields, which further reduce the probability of scrambler initialization error. This benefit, however, is achieved at the expense of additional overhead. Generally, the initial scrambler state may be recovered using M scrambler initialization bit-fields. The solution described above is a special case with M=2.

Because the scrambler is a primitive polynomial of degree 7, in this embodiment of the invention, there is a one-to-one correspondence between all 128 possible initial scrambler states and the value of any scrambled 7-zero-bit field. Thus, each received scrambler recovery bit-field can be easily translated into the scrambler initialization value that would make that bit-field equal to the specified value (zero in the described embodiment), by means of a look-up table. This determined scrambler initialization value may then be used to further de-scramble the received data frame to yield a correctly de-scrambled data frame.

In one embodiment of the invention, the general procedure for scrambler recovery is as follows:

1) For each of the M scrambler recovery fields, find the corresponding scrambler initialization value using a look-up-table on the received bit-field.

2) In addition to these M observed scrambler initialization estimates, the service field provides an implied estimate of a desired value, for example, all-zeros, giving M+1 estimates.

3) Using these M+1 estimates, find the value that occurs most frequently (if there is a tie, choose an arbitrary winner), and use that value to initialize the scrambler.

4) XOR the resulting scrambler sequence with the received bit sequence.

This is a simple, general, optimal procedure for correcting the scrambler sequence given M scrambler-recovery bit-fields. Other simple variations on this solution are also possible. For example, the scrambler initialization bit-fields could have non-zero values (for example, all "ones") when XORed with the correct pseudo-random sequence.

FIG. 5 further illustrates a MAC layer signal including scrambler recovery fields for determining a scrambler initialization value according to one embodiment of the present invention that may be used to further de-scramble a data frame properly. As is shown in FIG. 5, a table (representing relationally stored values in memory) includes a mapping between received values for the scrambler recovery fields, and (identification of) the scrambler initialization values. The dashed lines 510 and 512 illustrate a relationship between the scrambler recovery fields and the scrambler initialization value. More specifically, for every possible de-scrambled value of the scrambler recovery fields, there exists a scrambler initialization value that would, when used to further de-scramble a received and incorrectly de-scrambled data frame, would result in a properly de-scrambled data frame. The mapping of improperly de-scrambled scrambler recovery fields and corresponding scrambler initialization values are the entries in the table of FIG. 5.

For each row 514, 516 and 518 of the table in FIG. 5, a de-scrambled scrambler recovery value p1, p2, . . . p(n) corresponds to a corresponding scrambler initialization value s1, s2, . . . s(n). The value of n, in the described embodiment, is $2^7$, which is equal to 128. The reason for this is that the described embodiment only uses one of 128 scrambler initialization values. Accordingly, only a 7 bit wide signal is required to identify the scrambler initialization value. Thus, for example, a scrambler recovery field value of p1, as shown in row 514, corresponds to scrambler initialization value s1. The table of FIG. 5 thus shows a dashed arrow 520 to indicate the mapped relationship between the scrambler recovery field values and the scrambler initialization values.

In operation, the table of FIG. 5 is used in conjunction with the data received in MAC header 502 of FIG. 5 as well as the service field in the physical layer. The first seven bits, in the described embodiment of the invention, of a service field generated and transmitted at the physical layer define a scrambler initialization identification value that is to be used to identify a scrambler initialization value that is used to de-scramble the frame body. As may be seen, this service field is received prior to the MAC header and frame body (MAC layer transmissions). Thus, the de-scrambling is initiated prior to any evaluation of the scrambler recovery fields being received. If the scrambler initialization identification value received in the service field is received with error, however, the scrambler cannot be correctly initialized.

De-scrambling, in the described embodiment of the invention, includes receiving and loading a scrambler initialization value into a scrambler, generating a pseudo-random sequence which is then exclusively ORed with received data to de-scramble the received data.

Figure 6:
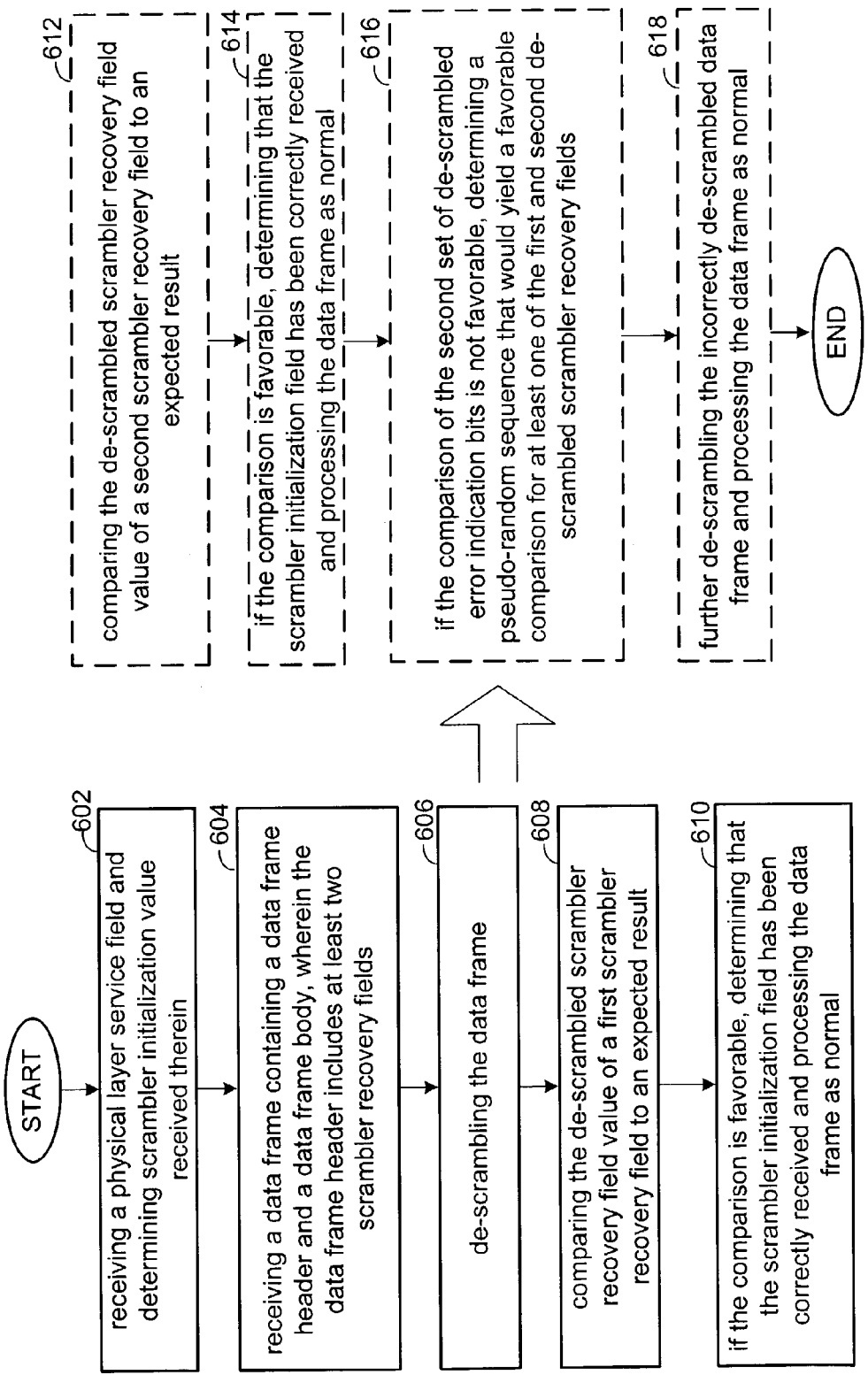
FIG. 6 is a flowchart that illustrates operation of the forward error correction according to one embodiment of the present invention.

FIG. 6 is a flowchart that illustrates operation of one embodiment of the present invention. Initially, a receiver (either wired or wireless) receives a physical layer service field containing a scrambler initialization value therein and extracts (determines) a scrambler initialization value (step 602). Thereafter, the receiver receives a data frame containing a header and a data frame body, wherein the frame header includes at least two scrambler recovery fields (step 604). While the described embodiment includes at least two scrambler recovery fields, it is understood that variations may be had in which more or less scrambler recovery fields are used. For example, in one alternate embodiment, only one scrambler recovery field is used. A disadvantage of that alternate embodiment, however, is that the protection provided thereby is not as robust as in the described embodiment.

One step in the described invention includes initialization of a scrambler based upon the determined scrambler initialization value. In one embodiment of the present invention, this step includes initializing a scrambler based upon a starting or initialization value actually transmitted within the service field at the physical layer. In the described embodiment, however, the scrambler initialization field includes an identification of a scrambler initialization instead of the actual initialization value. Thus, the scrambler initialization field is also referred to herein as a scrambler initialization identification field. Once the scrambler has been initialized, and once the data frame has been received (in step 604), the invention includes de-scrambling at least one scrambler recovery field using a pseudorandom sequence identified by the scrambler initialization field to produce a first set of de-scrambled error indication bits in the described embodiment of the invention. In one embodiment of the invention, the entire data frame is de-scrambled (step 606).

Thereafter, the invention includes comparing the first set of de-scrambled scrambler recovery bits to a reference value or expected result (step 608). In the described embodiment of the invention, the reference value or expected result is a string of zeroes. Alternatively, the specified value or reference value may be a string of ones or a combination thereof. If the comparison is favorable, the invention includes determining that the scrambler initialization field has been correctly received and processing the data frame as normal (step 610). If the comparison is not favorable, the invention includes the remaining optional steps of FIG. 6.

The first of the optional steps includes comparing a de-scrambled recovery field value of a second scrambler recovery field to an expected result or value (step 612). If the comparison is favorable, the invention includes determining that the scrambler initialization has been correctly received and processing the data frame as normal (step 614). If the comparison is not favorable, however, the invention includes determining a pseudorandom sequence that would yield a favorable comparison for at least one of the first and second scrambler recovery fields when de-scrambled with the determined pseudorandom sequence and compared to the reference value (step 616). The determined pseudorandom sequence is then used to initiate the scrambler to further de-scramble the incorrectly de-scrambled data frame and processing the data after further de-scrambling as normal (step 618).

As described before, the described inventive method with two recovery fields works if only one, at most, of the scrambler recovery fields and the scrambler initialization field is received in error. Thus, if the comparison is unfavorable for both scrambler recovery fields, then it follows that the scrambler initialization field was received incorrectly. Thus, the data frame was de-scrambled incorrectly. Thus, the invention includes determining a scrambler initialization value that would correct the incorrectly de-scrambled data frame to result in a correctly de-scrambled data frame. If, on the other hand, the scrambler initialization field was received correctly, then de-scrambling the first and second scrambler recovery fields with the pseudorandom sequence identified by the scrambler initialization field will yield a comparison that is favorable for one of the two scrambler recovery fields. Accordingly, the data frame having already been de-scrambled prior to the comparison steps, may be processed as normal.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the scope of the present invention as defined by the claims.

What is claimed is:

1. A method for operating upon a scrambler initialization field in a received data frame, comprising:
    receiving, at the physical layer, a scrambler initialization value;
    receiving, at the MAC layer, a data frame header and a data frame body, wherein the data frame header includes at least two scrambler recovery fields;
    initializing a scrambler based upon the scrambler initialization value;
    de-scrambling the data frame header and body including the two scrambler recovery fields using a pseudorandom sequence identified by the scrambler initialization field to produce at least two sets of de-scrambled scrambler recovery bits;
    comparing a first of the at least two sets of de-scrambled scrambler recovery bits to at least one reference value; and
    if the comparison produces a first result, determining that the scrambler initialization field has been correctly received.

2. The method of claim 1 further including:
    if the comparison produces a second result, comparing a second of the at least two sets of de-scrambled scrambler recovery bits to the at least one reference value;
    if the comparison produces the first result, determining that the scrambler initialization field has been correctly received; and
    if the comparison produces the second result, determining that the scrambler initialization field has been incorrectly received.

3. The method of claim 2 further including determining a pseudorandom sequence that would cause the comparison to yield the first result for at least one of the two scrambler recovery fields and initiating scrambling based upon the determined pseudorandom sequence to further de-scramble the data frame header and body.

4. A method for operating upon a scrambler initialization field in a received data frame, comprising:

receiving, at the physical layer, a scrambler initialization value;

receiving, at the MAC layer, a data frame containing a data frame header and a data frame body, wherein the data frame header at least two scrambler recovery fields;

initializing a scrambler based upon the scrambler initialization value received at the physical layer;

de-scrambling at least one scrambler recovery field using a pseudorandom sequence identified by the scrambler initialization field to produce a first set of de-scrambled scrambler recovery bits;

comparing the first set of de-scrambled scrambler recovery bits to a reference value;

if the comparison is favorable, determining that the scrambler initialization field has been correctly received; and processing the data as normal.

5. The method of claim 4 further including the step of de-scrambling a second scrambler recovery field using a pseudorandom sequence identified by the scrambler initialization field to produce a second set of scrambler recovery bits;

comparing the second set of de-scrambled scrambler recovery bits to a reference value;

if the comparison is favorable, determining that the scrambler initialization field has been correctly determined.

6. The method of claim 5 further including the step of, if the comparison of the second set of de-scrambled scrambler recovery bits is not favorable, determining a pseudorandom sequence that would yield a favorable comparison for at least one of the first and second scrambler recovery fields when de-scrambled with the determined pseudorandom sequence and compared to the reference value and further descrambling the data frame header and body.

7. A radio transceiver, comprising:

wireless communication circuitry for transmitting and receiving radio frequency communication signals, the wireless communication circuitry further including a plurality of transceiver elements;

a processor module coupled to receive and generate digital communication signals from and to the wireless communication circuitry;

wherein the processor module receives a data frame at the MAC layer and a scrambler initialization field at the physical layer that identifies a pseudorandom sequence for de-scrambling data frame, the data frame having a header with at least one scrambler recovery field;

wherein the processor module determines a scrambler initialization field was received in error;

wherein the processor module determines a pseudorandom sequence that, when logically combined with at least one scrambler recovery field, yields a specified result; and wherein the processor further de-scrambles the data frame with the determined pseudorandom sequence.

8. The radio transceiver of claim 7 wherein the processor module determines a scrambler pseudorandom sequence by searching for a bit pattern in a table that matches a bit pattern for at least one of the scrambler recovery fields wherein the table includes a mapping of pseudorandom sequences for the scrambler in relation to scrambler recovery fields.

9. The radio transceiver of claim 7 wherein the radio transceiver further compares a logic result from applying the scrambler pseudorandom sequence in a specified manner against a received first scrambler recovery field as a part of determining whether the scrambler initialization field was received in error.

10. The radio transceiver of claim 9 wherein the radio transceiver further compares a logic result from applying the scrambler pseudorandom sequence in a specified manner against a received second scrambler recovery field as a part of determining whether the scrambler initialization field was received in error.

11. The radio transceiver of claim 10 wherein the radio transceiver determines that the scrambler initialization field was received in error if the steps of comparing the logic results from the de-scrambled first and second scrambler recovery fields did not yield favorable comparisons.

12. The radio transceiver of claim 7 wherein the radio transceiver further compares a logic result from applying the scrambler pseudorandom sequence in a specified manner against received first and second scrambler recovery fields to a specified value to determine whether the scrambler initialization field was received in error.

13. A data frame header, comprising:

a header portion including a MAC header portion and a header FEC portion;

a first scrambler recovery field portion arranged sequentially after the MAC header portion and before the header FEC portion;

a second scrambler recovery field portion arranged sequentially after the header FEC portion.

14. The data frame header of claim 13 wherein the MAC header portion is at least 32 bytes long.

15. The data frame header of claim 14 wherein the first and second scrambler recovery field portions are each one byte long.

* * * * *